«12» United States Patent
Inui et al.

(10) Patent No.: US 9,185,371 B2
(45) Date of Patent: Nov. 10, 2015

(54) LIQUID CRYSTAL PROJECTOR HAVING SHADE MEMBER PREVENTING DETERIORATION OF POLARIZING PLATE

(75) Inventors: Shinro Inui, Hachioji (JP); Nobuki Matsui, Saitama (JP)

(73) Assignee: HITACHI MAXELL, LTD., Osaka (JP)

( * ) Notice: Subject to any disclaimer, the term of this patent is extended or adjusted under 35 U.S.C. 154(b) by 197 days.

(21) Appl. No.: 13/883,773

(22) PCT Filed: Feb. 9, 2011

(86) PCT No.: PCT/JP2011/052785
§ 371 (c)(1),
(2), (4) Date: Jun. 26, 2013

(87) PCT Pub. No.: WO2012/108019
PCT Pub. Date: Aug. 16, 2012

(65) Prior Publication Data
US 2014/0009698 A1 Jan. 9, 2014

(51) Int. Cl.
*G03B 21/16* (2006.01)
*H04N 9/31* (2006.01)
*G02F 1/1333* (2006.01)
*G03B 21/14* (2006.01)
*G03B 33/12* (2006.01)
*G02F 1/1335* (2006.01)

(52) U.S. Cl.
CPC ........ *H04N 9/3144* (2013.01); *G02F 1/133385* (2013.01); *G03B 21/145* (2013.01); *G03B 21/16* (2013.01); *G02F 1/133528* (2013.01); *G03B 33/12* (2013.01)

(58) Field of Classification Search
CPC .... G03B 21/16; G03B 21/20; G03B 21/2073; G03B 21/14; G03B 21/145; H04N 9/3144; G02F 1/133385; G02F 1/133528
See application file for complete search history.

(56) References Cited

U.S. PATENT DOCUMENTS

| 5,838,415 A | * | 11/1998 | Hayashi et al. | 349/161 |
| 5,892,561 A | * | 4/1999 | Suzuki et al. | 349/122 |
| 7,118,222 B2 | * | 10/2006 | Kitabayashi | 353/52 |
| 2003/0063389 A1 | * | 4/2003 | Koyama | 359/618 |
| 2005/0117077 A1 | * | 6/2005 | Utsunomiya | 349/5 |
| 2005/0195369 A1 | * | 9/2005 | Shikita et al. | 353/20 |
| 2005/0213018 A1 | * | 9/2005 | Hoshino et al. | 349/161 |

(Continued)

FOREIGN PATENT DOCUMENTS

| JP | 06-281948 | 10/1994 |
| JP | 9-80374 | 3/1997 |

(Continued)

OTHER PUBLICATIONS

JPO, JP 2012-556702 Prosecution History, Allowance: Mar. 31, 2015, Amendment/Arguments: Dec. 11, 2014, Refusal: Nov. 5, 2014.*

(Continued)

*Primary Examiner* — Jori S Reilly-Diakun
(74) *Attorney, Agent, or Firm* — Baker Botts L.L.P.

(57) ABSTRACT

A liquid crystal projector which prevents deterioration of the aluminum grid inorganic polarizing plate due to dust in the cooling air for cooling the liquid crystal panel module. A shade member along the surface of the inorganic polarizing plate prevents the surface from being directly hit by the cooling wind and thus prevents dust from attaching to the surface of the plate.

6 Claims, 6 Drawing Sheets

(56) References Cited

U.S. PATENT DOCUMENTS

| | | | |
|---|---|---|---|
| 2005/0213228 A1* | 9/2005 | Fujimori et al. | 359/820 |
| 2007/0002191 A1* | 1/2007 | Hashizume et al. | 349/5 |
| 2007/0091216 A1* | 4/2007 | Hashizume et al. | 349/5 |
| 2007/0103606 A1* | 5/2007 | Hashizume et al. | 349/5 |
| 2010/0060858 A1* | 3/2010 | Minami | 353/20 |
| 2010/0214500 A1* | 8/2010 | Kimura | 349/8 |

FOREIGN PATENT DOCUMENTS

| | | |
|---|---|---|
| JP | 9-197364 | 7/1997 |
| JP | 11-52324 | 2/1999 |
| JP | 2002-318340 | 10/2002 |
| JP | 2003-207639 | 7/2003 |
| JP | 2005-195824 | 7/2005 |
| JP | 2007-33746 | 2/2007 |
| JP | 2009-282416 | 12/2009 |

OTHER PUBLICATIONS

JP Office Action for JP Application No. 2012-556702, issued on Nov. 5, 2014.

\* cited by examiner

LIQUID CRYSTAL PROJECTOR HAVING SHADE MEMBER PREVENTING DETERIORATION OF POLARIZING PLATE

TECHNICAL FIELD

The present invention relates to a liquid crystal projector.

BACKGROUND ART

A liquid crystal projector for projecting and displaying an image requires a cooling mechanism to prevent the temperature of internal liquid crystal panels and components such as polarizing plates located in proximity to the liquid crystal panels from rising beyond a predetermined range within which performance is guaranteed. As a cooling method, air cooling is generally used. A built-in fan takes in air from outside the liquid crystal projector and blows the air as cooling air to the liquid crystal panels and polarizing plates from underneath.

Patent Document 1 discloses a cooling mechanism using a sirocco fan for a projection type liquid crystal display device.

CITATION LIST

Patent Literature

Patent Literature 1: Japanese Unexamined Patent Application Publication No. Hei 11-52324

SUMMARY OF INVENTION

Technical Problem

In the manner of taking in outside air and cooling the components of a liquid crystal projector, as described above, it is needed to prevent taking in dust together and, therefore, a filter for dust prevention is provided in an air intake section. However, because it is difficult to completely eliminate dust by the filter, actually, fine dust particles attach to the liquid crystal panels and polarizing plates with the passage of time. As is well known, separate liquid crystal panels and polarizing plates are provided respectively for the colors R (red), G (green), and B (blue) of light. How dust particles attach to the liquid crystal panels and polarizing plates differs for each panel and each plate. Hence, the attachment of dust particles not only causes a decrease in illuminance, also poses a problem of unbalancing the colors, thus resulting in color shading in an image produced.

Although organic films have often been used as polarizing plates in the past, inorganic polarizing plates having a longer lifetime than the organic films, e.g., aluminum grid inorganic polarizing plates have recently been put into use. In the case of an inorganic polarizing plate, particularly if wet dust particles attach to its end surface, they travel along wire grooves by capillarity and deposit in streaks, which in turn produces streaky color shading on a projection picture and, in the worst case, corrodes the aluminum grid. Especially for a polarizing plate that is disposed such that the longitudinal direction of wire grooves is parallel with a cooling air flow direction in installed condition, a problem is liable to occur, because no coating is provided on the section of the aluminum grid on the polarizing plate's end surface exposed to the cooling air because of a manufacturing process.

In view of the above-noted problems, an object of the present invention is to provide a liquid crystal projector in which attachment of dust is reduced.

Solution to Problem

The present invention for solving the above-noted problems is a liquid crystal projector that converts a supplied image signal to a light signal by a liquid crystal panel unit and projects an image, characterized by including:

a light source unit that generates light; a liquid crystal panel unit including a liquid crystal panel that is irradiated by light supplied from the light source unit and allows passage of the light depending on a level of the image signal and a polarizing plate; a projection lens that projects light passed through the liquid crystal panel unit toward outside; a cooling section that generates cooling air for cooling the liquid crystal panel unit and blows the cooling air toward the liquid crystal panel unit; and a shade member for reducing the cooling air that hits against one surface of the polarizing plate in the liquid crystal panel unit, the one surface facing a direction in which the cooling section blows the cooling air toward the liquid crystal panel unit.

Advantageous Effect of Invention

According to the present invention, the invention can provide a liquid crystal projector in which attachment of dust is reduced and has an advantageous effect in which it can contribute to improving fundamental performance of the liquid crystal projector.

DESCRIPTION OF EMBODIMENTS

In the following, an embodiment of the present invention will be described by way of the drawings. A general structure of a liquid crystal projector is first described.

Figure 1:
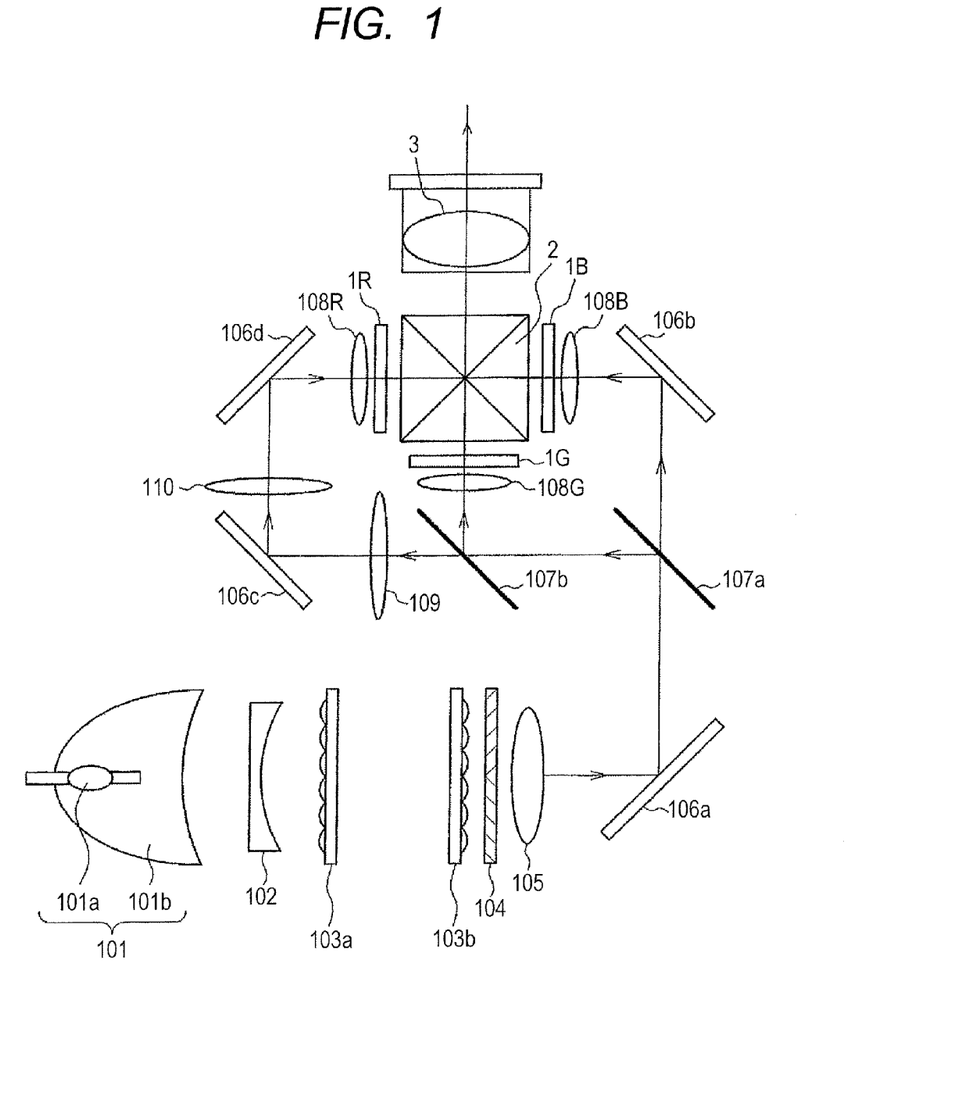
FIG. 1 is a block diagram of a liquid crystal projector.

FIG. 1 is a block diagram of a liquid crystal projector, particularly focusing on its optical system. In FIG. 1, a light source unit 101 includes a bulb 101a which is a light emitting element and a reflector 101b as a reflecting surface. A light flux outgoing from the bulb 101a placed in a first focal position of the reflector 101b having an elliptical shape is reflected by the reflecting surface to converge on a second focal position of the reflector 101b. The converged light flux whose size was shrunk is converted to a parallel light flux by a concave lens 102 having a parallelizing function. If the reflector 101b is made to have a paraboloidal shape, the concave lens 102 having a paralleling function is not needed.

The parallel light flux outgoing from the concave lens 102 is split into partial light fluxes by the cell lenses of a first multi-lens array 103a and the partial light fluxes are converged onto the cell lenses of a second multi-lens array 103b mating with the first multi-lens array 103a. The converged partial light fluxes are once separated into two linearly polarized lights whose directions of oscillation are at right angles to each other by a linear polarization element 104. By tuning the oscillation direction of one of the two linearly polarized lights to the oscillation direction of the other, these linearly polarized lights are then converted to a linearly polarized light that oscillates in a single direction. The partial light fluxes outgoing from the linear polarization element 104 are delivered toward liquid crystal panel units 1R, 1G, and 1B for R, G, and B colors in a superimposed fashion through a superimposing lens 105.

In a light path between the superimposing lens 105 and the liquid crystal panel units 1R, 1G, and 1B, reflecting mirrors 106a, 106b, 106c, and 106d are provided to redirect the light path and dichroic mirrors 107a and 107b are provided as optical elements for color separation. In front of the liquid crystal panel units 1R, 1G, and 1B, collimator lenses 108R, 108G, and 108B are disposed which parallelize main beams of projection light fluxes. In a red light path which is longer than green and blue light paths, relay lenses 109 and 110 are disposed to project superimposed light fluxes onto the position of a liquid crystal panel unit 1R.

For the light fluxes from the bulb 101a supplied to the liquid crystal panel units 1R, 1G, and 1B in this way, their amounts that can pass through the liquid crystal panels are varied depending on the levels of an image R signal, an image G signal, and an image B signal which are separately supplied to the liquid crystal panel units 1R, 1G, and 1B, respectively. Thereby, information carried by these image signals is given to the light fluxes. For this purpose, besides the liquid crystal panels, the liquid crystal panel units 1R, 1G, and 1B are provided with polarizing plates for allowing passage of light fluxes having a predetermined direction of oscillation.

The light fluxes after passing through the liquid crystal panel units 1R, 1G, and 1B are combined together by a cross prism 2 to make an image in accordance with the image signals displayed on an externally provided screen (not depicted) via a projection lens 3.

The following description regarding the present embodiment particularly focuses on matters concerning the liquid crystal panels and the polarizing plates included in the liquid crystal panel units 1R, 1G, and 1B. The liquid crystal panel units 1R, 1G, and 1B are components in which, in particular, a characteristic change due to dust attachment and temperature change (particularly, temperature rise) poses a problem. This characteristic change makes a change in the brightness and color balance of a displayed image and, besides, has an adverse effect on the lifetime. For this reason, the liquid crystal projector includes a cooling mechanism for cooling the liquid crystal panel units 1R, 1G, and 1B.

A cooling fan in the cooling mechanism cools the liquid crystal panel units 1R, 1G, and 1B by blowing air taken in from outside the liquid crystal projector toward a substantially vertical direction with respect to the plane depicted by FIG. 1. Next, the cooling mechanism is described.

Figure 2:
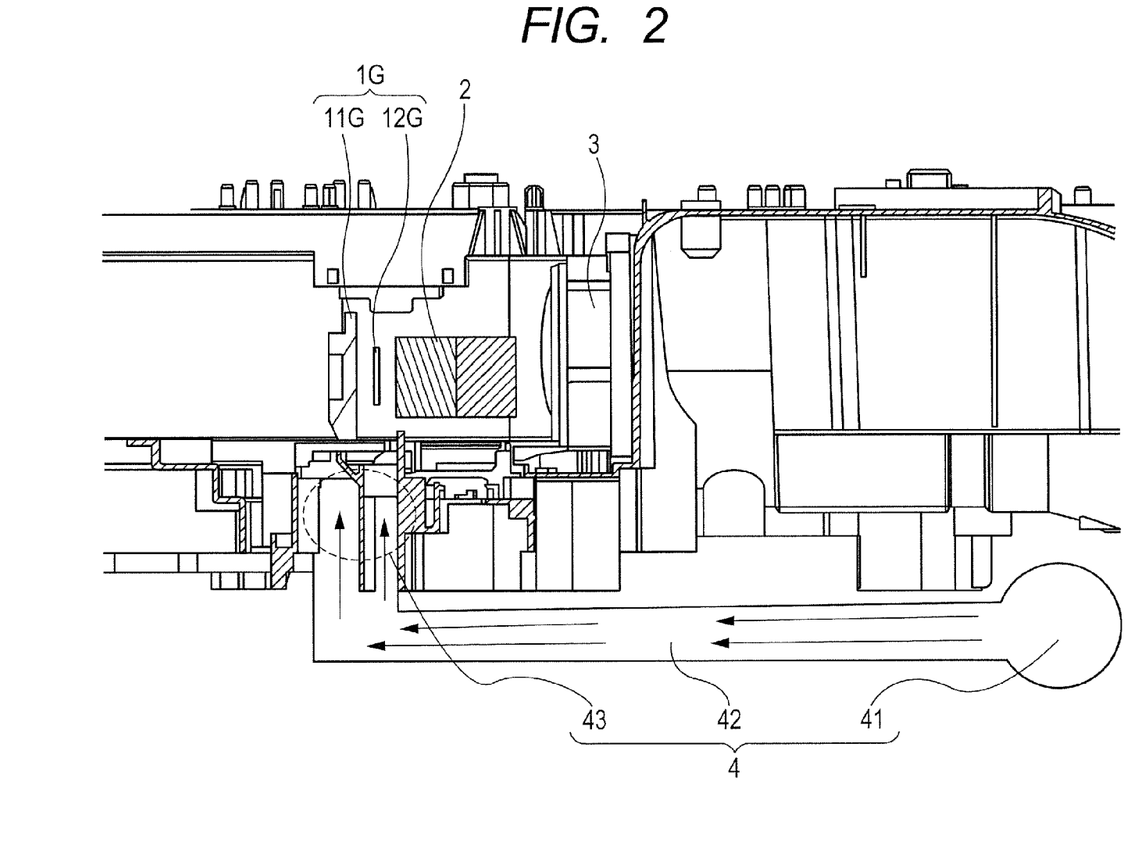
FIG. 2 is a partial layout view of the liquid crystal projector.

FIG. 2 is a partial layout view of the liquid crystal projector. Here is depicted a layout of a section from a liquid crystal panel unit to the projection lens and its vicinity from a right lateral view, i.e., viewed from the right side of the block diagram in FIG. 1. Although only the liquid crystal panel unit 1G for green light provided on the left side of the cross prism 2 is depicted in FIG. 2, it should be appreciated that the liquid crystal panel unit 1B for blue light is provided in front of the cross prism 2 and the liquid crystal panel unit 1R for red light is provided on the opposite side of the cross prism 2. Here, as for the liquid crystal panel 1G, a liquid crystal panel 11G and a polarizing plate 12G are assigned separate signs to denote them. In FIG. 2, additionally, the projection lens 3 and a cooling section 4 are depicted. The cooling section is schematically depicted to avoid complicate depiction. The cooling section 4 includes a cooling air driving part 41, a duct 42, and a cooling air blowing part 43. Arrows in the figure indicate a cooling air flow.

The cooling air driving part 41 in the cooling section 4 is equipped with, for example, a rotating fan that takes in air from outside the liquid crystal projector and feeds the air into the duct 42, as cooling air, leftward in the figure. The cooling air fed into the duct 42 is redirected upward in the figure when coming substantially under the liquid crystal panel unit 1G (1R, 1B) and blown from the cooling air blowing part 43 upward from underneath of the liquid crystal panel unit 1G (1R, 1B). Thereby, the temperature of the liquid crystal panel unit 1G (1R, 1B) is kept from rising and the liquid crystal panel unit 1G (1R, 1B) can operate in a predetermined temperature range within which its performance is guaranteed.

Figure 3:
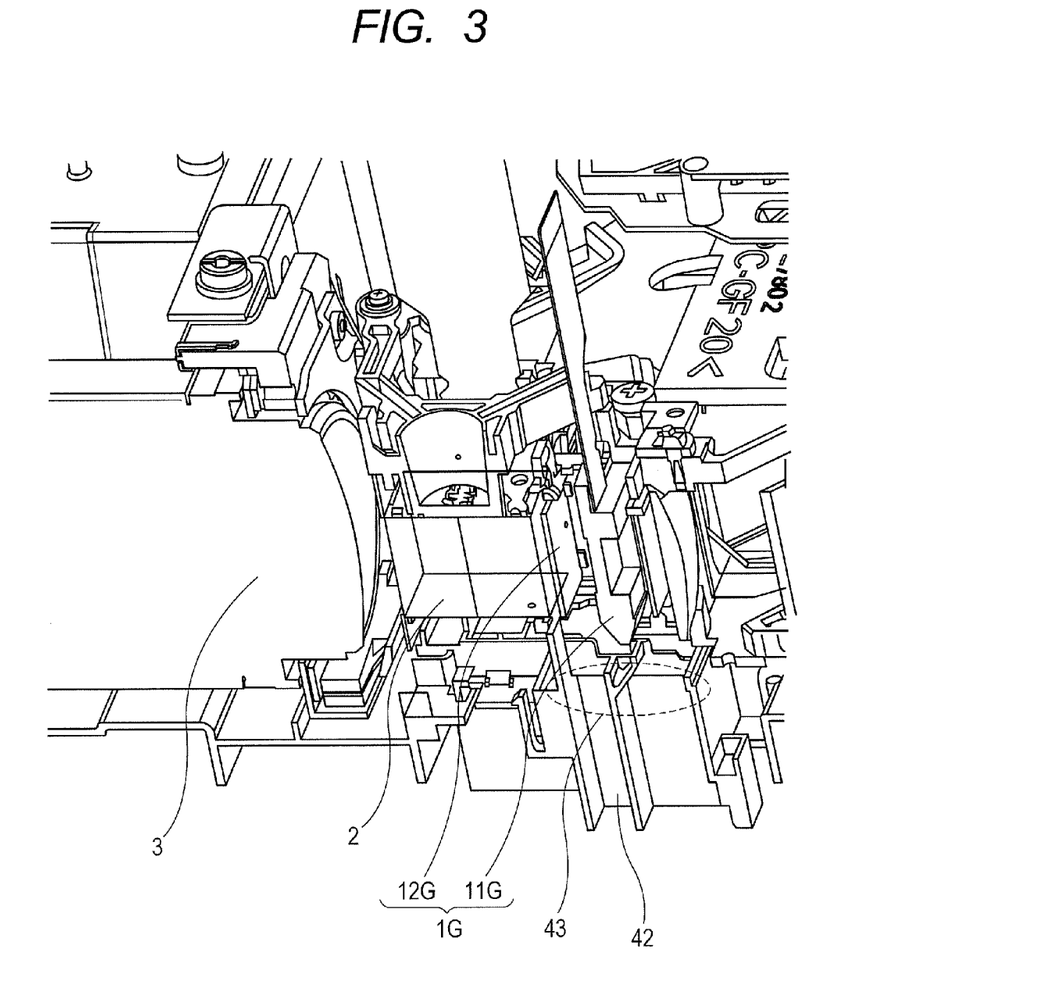
FIG. 3 is a partial sectional view of the liquid crystal projector.

FIG. 3 is a partial sectional view of the liquid crystal projector and depicts a vertical section from a liquid crystal panel unit to the projection lens and its vicinity, when viewed from the left side and a diagonally upper position of the block diagram in FIG. 1, unlike FIG. 2.

Cooling air that has come substantially under the liquid crystal panel unit 1G goes upward in the figure through the duct 42 and is blown from the cooling air blowing part 43 toward the liquid crystal panel 11G (11R, 11B) and the polarizing plate 12G (12R, 12B). However, the cooling air includes traces of dust particles taken in from outside air and there is a problem in which the dust particles attach to and deposit on the surfaces of these components, particularly, their elongated underside surfaces in the figure.

As described previously, particularly if the polarizing plate 12G (12R, 12B) is an aluminum grid inorganic polarizing plate and dust particles attached to and deposited on its elongated underside surface (hereinafter termed as an underside end surface) are water-absorbed ones, there is a problem in which the attached dust particles travel along wire grooves forming the grid and deposit in streaks, which in turn produces color shading in a projected image and, in the worst case, corrodes the aluminum grid.

In order to resolve this problem, in the present embodiment, it is one feature that a shade element is provided under the underside end surface of the polarizing plate 12G (12R, 12B) exposed to cooling air in the figure (in a position facing a direction of cooling air being blown) to reduce the amount of cooling air including dust particles which directly hits against the underside end surface of the polarizing plate 12G (12R, 12B) and prevent the attachment of dust particles noted above.

Figure 4:
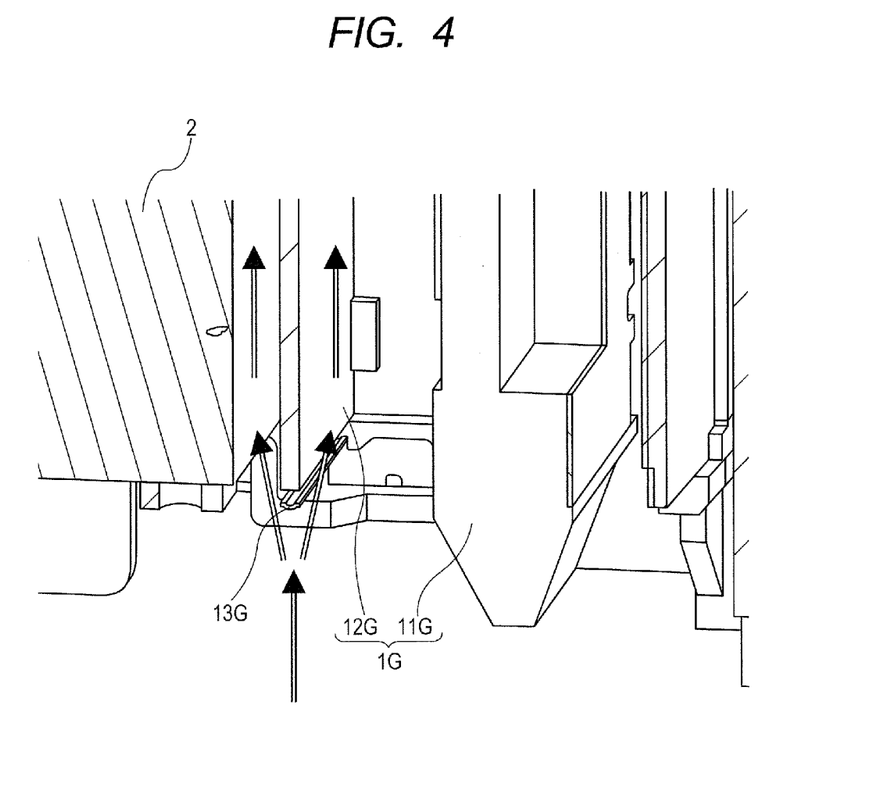
FIG. 4 is a sectional view in the vicinity of a liquid crystal panel unit.

FIG. 4 is a sectional view in the vicinity of the liquid crystal panel unit and depicts a vertical section in the vicinity of the bottom of the liquid crystal panel unit, viewed from the left side of the block diagram in FIG. 1. The foregoing cooling section 4 blows the cooling air toward a direction substantially perpendicular to a thickness direction of the polarizing plate 12G (12R, 12B), that is, toward a direction substantially perpendicular to an optical axis of the projection lens 3.

Under the polarizing plate 12G (12R, 12B), in the figure, which is included in the liquid crystal panel unit 1G (1R, 1B), a shade member 13G (13R, 13B) is provided to reduce the amount of cooling air which directly hits against the underside end surface of the polarizing plate 12G (12R, 12B). It should be appreciated that the shade member is provided to reduce the amount of cooling air hitting against the entire surface of the underside of the polarizing plate 13G in the front side and toward depth in the figure.

Figure 5:
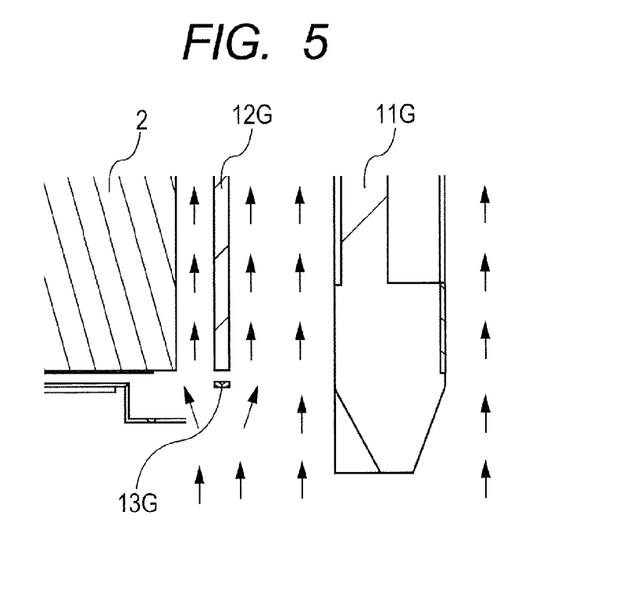
FIG. 5 is a view representing a cooling air flow in the vicinity of the liquid crystal panel unit.

FIG. 5 is a view representing a cooling air flow in the vicinity of the liquid crystal panel unit, when viewed from substantially the same orientation as is the case for FIG. 4. FIG. 5 represents a result of simulation on the air flow. Cooling air is flowing along the wide surfaces of the liquid crystal panel 11 and the polarizing plate to cool them. In this situation, owing to the function of the shade member 13, the cooling air flows so as not to directly hit against the underside end surface of the polarizing plate 12. More specifically, in the case where the shade member 13 is installed, it is concerned that an essentially required cooling effect decreases and this makes an increase in the temperature of the liquid crystal panel unit 1G (1R, 1B), but it here turns out that the purpose can be achieved in a range in which this poses no problem.

Then, stated are conditions for allowing cooling air to flow so as not to directly hit against the underside surface of the polarizing plate 12 in a range without impairing the effect of cooling the liquid crystal panel unit.

Figure 6:
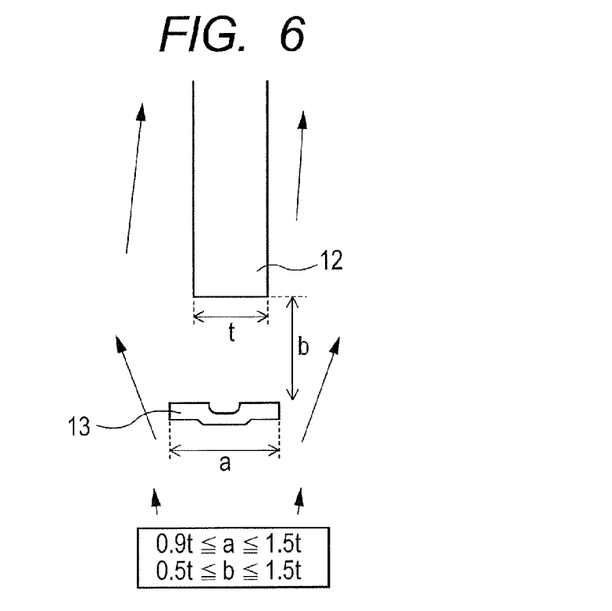
FIG. 6 is a sectional view in the vicinity of a polarizing plate.

FIG. 6 is a sectional view in the vicinity of the polarizing plate, when viewed from substantially the same orientation as is the case for FIG. 5, particularly providing an enlarged view in the vicinity of the shade member 13. Here, the width of the shade member 13 is denoted by a, its distance from the polarizing plate 12 is denoted by b, and the thickness of the polarizing plate 12 is denoted by t. In the case of FIG. 6, a=1.5t and b=1.5t. As depicted, a situation is realized in which cooling air does not directly hit against the underside surface of the polarizing plate and flows along the wide surfaces of the liquid crystal panel 11 and the polarizing plate 12 to cool them. As a result of further simulation, it turns out that satisfying the following conditions is desired, as presented in the figure also.

$$0.9t \leq a \leq 1.5t \quad \text{(Equation 1)}$$

$$0.5t \leq b \leq 1.5t \quad \text{(Equation 2)}$$

In FIG. 6, the shade member 13 has a shape having a concave in the center and it can redirect the cooling air flow according to this shape.

Figure 7:
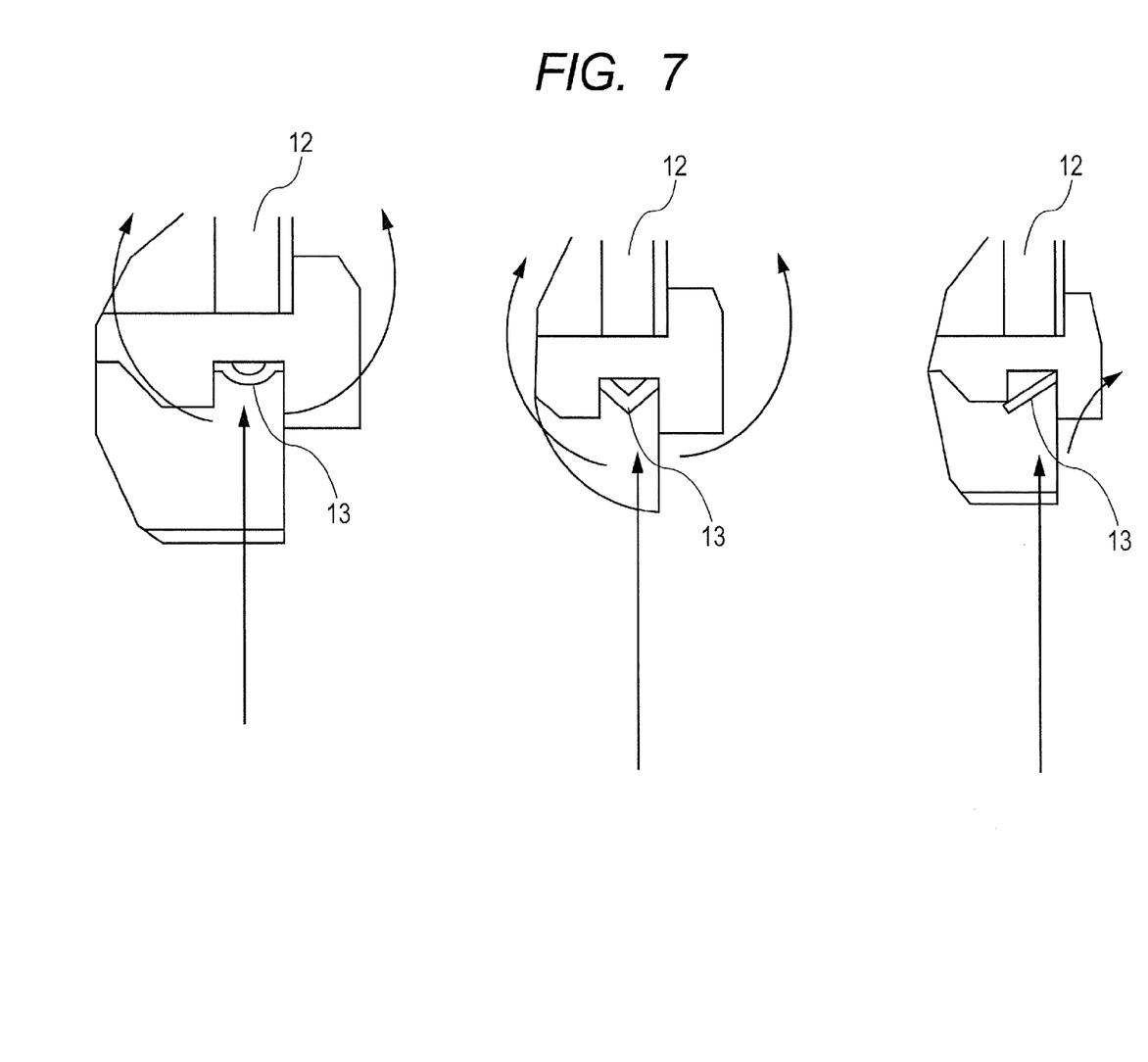
FIG. 7 is a view representing a cooling air flow in the vicinity of the polarizing plate.

FIG. 7 is a view representing the cooling air flow in the vicinity of the polarizing plate and presents three different examples. A left-hand example in the figure is a case where the shade member 13 has a round concave similar to that in FIG. 6 and a middle example is a case where the shade member 13 has a V-shape vertical section. In both examples, equivalent cooling air passes along both sides of the polarizing plate 12.

A right-hand example is a case where the shade member 13 is installed at a tilt with its right end up in the figure. In this example, cooling air passes mainly along the right side surface of the polarizing plate 12. In the polarizing plate 12, the aluminum grid of the inorganic polarizing plate mentioned previously is provided on the left side surface in the figure, that is, the surface facing the liquid crystal panel 11G (11R, 11B) mentioned previously. The shade member 13 like this should preferably be installed to allow cooling air to flow mainly along the right side surface in the figure in order to avoid influence of dust on the aluminum grid. It should be noted that, in FIG. 6 above, the center of the vertical section of the shade member 13 is slightly off to the left hand in the figure from the center of the vertical section of the polarizing plate 12 and this manner of positioning provides a similar effect.

According to the present embodiment, as described hereinbefore, it is possible to resolve the problem in which traces of dust particles included in cooling air attach to the polarizing plate without impairing the cooling effect of the cooling air. It is also possible to provide a solution to the size of a shade member that is provided for this purpose.

The embodiment set forth hereinbefore is exemplary and does not limit the present invention. Different embodiments can be conceived based on the idea of the present invention, for example, such as an embodiment in which cooling air is allowed to flow in a different direction and an embodiment for preventing dust that attaches to a component other than the polarizing plate, and all of those embodiments are embraced in the scope of the resent invention.

LIST OF REFERENCE SIGNS 1 (1R, 1G, 1B): Liquid crystal panel unit, 11 (11R, 11G, 11B): Liquid crystal panel, 12 (12R, 12G, 12B): Polarizing plate, 13 (13R, 13G, 13B): Shade member, 2: Cross prism, 3: Projection lens, 4: Cooling section, 41: Cooling air driving part, 42: Duct, 43: Cooling air blowing part

The invention claimed is:

1. A liquid crystal projector that converts a supplied image signal to a light signal comprising:
    a light source that generates light;
    a liquid crystal panel that is irradiated by light supplied from the light source and allows passage of the light depending on a level of said image signal;
    a polarizing plate, disposed next to the liquid crystal panel, having an elongated underside surface;
    a projection lens that projects light passed through the liquid crystal panel toward outside;
    a cooling section that generates cooling air for cooling said liquid crystal panel and said polarizing plate and blows the cooling air toward said liquid crystal panel and said polarizing plate; and
    a shade member disposed directly below the elongated underside of said polarizing plate that reduces said cooling air that hits against the elongated underside surface of said polarizing plate, and prevents dust particles included in the cooling air from attaching to the elongated underside surface of the polarizing plate,
    wherein said shade member has a curved shape such that an upwind surface of the shade member that faces toward the cooling air has a convex shape and a downwind surface of the shade member that faces the polarizing plate has a concave shape, and wherein said shade member is disposed toward a direction of one of the side surfaces of the polarizing plate thereby redirecting the cooling air substantially along one of the side surfaces of the polarizing plate.

2. The liquid crystal projector according to claim 1, wherein said cooling section blows said cooling air toward a direction substantially perpendicular to a thickness direction of said polarizing plate, where the direction is substantially perpendicular to an optical axis of said projection lens.

3. The liquid crystal projector according to claim 2, wherein said shade member and said polarizing plate have the following relation:

$$0.9t \leq a \leq 1.5t$$

$$0.5t \leq b \leq 1.5t$$

where t is thickness of said polarizing plate, a is width of said shade member in the thickness direction of said polarizing plate, and b is distance between said shade member and said polarizing plate.

4. The liquid crystal projector according to claim 1, wherein said polarizing plate is an inorganic polarizing plate.

5. The liquid crystal projector according to claim 4, wherein said cooling air mainly cools a surface opposite to a polarization plane of said inorganic polarizing plate.

6. A liquid crystal projector that converts a supplied image signal to a light signal comprising:
- a light source that generates light;
- a liquid crystal panel that is irradiated by light supplied from the light source and allows passage of the light depending on a level of said image signal;
- a polarizing plate, disposed next to the liquid crystal panel, having an elongated underside surface;
- a projection lens that projects light passed through the liquid crystal panel toward outside;
- a cooling section that generates cooling air for cooling said liquid crystal panel and said polarizing plate and blows the cooling air toward said liquid crystal panel and said polarizing plate; and
- a shading means for preventing dust particles included in the cooling air from attaching to the elongated underside surface of the polarizing plate, the shading means having a curved shape and being disposed directly below the elongated underside surface of the polarizing plate, wherein said cooling section blows said cooling air toward a direction substantially perpendicular to a thickness direction of said polarizing plate, where the direction is substantially perpendicular to an optical axis of said projection lens, and wherein said shade member and said polarizing plate have the following relation:

$$0.9t \leq a \leq 1.5t$$

$$0.5t \leq b \leq 1.5t$$

where t is thickness of said polarizing plate, a is width of said shade member in the thickness direction of said polarizing plate, and b is distance between said shade member and said polarizing plate.

* * * * *